United States Patent [19]

Weiss

[11] 4,286,112
[45] Aug. 25, 1981

[54] MESSAGE PREPARATION TIMING APPARATUS

[75] Inventor: Gary A. Weiss, Los Angeles, Calif.

[73] Assignee: Pacesetter Management Corp., Los Angeles, Calif.

[21] Appl. No.: 148,107

[22] Filed: May 9, 1980

[51] Int. Cl.³ .................. G07C 1/10; H04L 15/24; H04M 15/18
[52] U.S. Cl. ................. 178/23 R; 178/17 B; 179/7.1 R; 235/92 T; 346/94; 364/467
[58] Field of Search ............. 178/23 R, 17 R, 17 C, 178/3, 1, 17.5, 17 A, 17 B, 4; 179/6.31, 7.1 R; 364/467; 235/92 T, 92 TE, 92 AC, 92 PD, 92 DP, 92 C; 346/94; 400/62, 78

[56] References Cited

U.S. PATENT DOCUMENTS

| | | | |
|---|---|---|---|
| 2,150,240 | 3/1939 | Nichols | 346/94 |
| 2,191,798 | 2/1940 | McCann | 178/17 C |
| 2,481,112 | 9/1949 | Hanley | 235/92 TE |
| 3,035,765 | 5/1962 | Zenner et al. | 235/92 C |
| 3,099,512 | 7/1963 | Kohler | 346/94 |
| 4,041,291 | 8/1977 | Pavda | 364/467 |
| 4,065,663 | 12/1977 | Edwards | 235/92 T |
| 4,195,220 | 3/1980 | Bristol et al. | 235/92 T |

Primary Examiner—Thomas A. Robinson
Attorney, Agent, or Firm—Fischer and Tachner

[57] ABSTRACT

An apparatus is disclosed for use with teletypewriter consoles in teleprinter communication networks for providing transmission time information during message preparation; namely, the number of whole minutes of message time plus either the number of characters remaining to the next full minute, or tenths of minutes of additional message time used. Such information enables the user to anticipate and thus optimize message time for which he is charged in a rounding-up charge procedure commonly used in such teleprinter communication networks. A preferred embodiment consists of a microprocessor-based computer for converting each character on a perforated tape to a sub-unit of time corresponding to the appropriate transmission rate of either TELEX or TWX network services. A 6-digit display permits the user to observe the actual number of whole minutes and either number of characters to the next whole minute or number of tenths of minutes already used in addition to whole minutes as he is preparing a perforated tape containing the message to be transmitted at a subsequent time. By merely checking the display, the operator may be continuously apprised of the time in minutes and tenths of minutes, or time in whole minutes plus the number of characters remaining until the next whole minute of message time, based on the characters already punched onto the perforated tape. In addition, in the preferred embodiment the user may preset a minimum on-line time to account for time lost during answer-back and signing-off which does not ordinarily constitute actual message time but which is still charged to the user. A keyboard is provided for selecting the appropriate message rate for either TELEX or TWX and for entering the appropriate sign-on and sign-off additional time for which he is charged. A particularly novel feature of the invention, which precludes the need for modifying a teletypewriter console device with which the present invention is to be used, is a photosensor circuit through which perforated tape passes as it emanates from the tape perforating device connected to the teletypewriter console.

13 Claims, 7 Drawing Figures

MESSAGE PREPARATION TIMING APPARATUS

BACKGROUND OF THE INVENTION

1. Field of the Invention

This invention relates generally to apparatus for use with communications-related equipment and more specifically to a calculation device to aid in the preparation of wire service messages which minimizes cost per word to the user.

The preferred embodiment of the present invention is intended primarily for use with circuit-switched public teleprinter networks and more specifically with the teletypewriters that are commonly used for transmitting messages over such networks. It is generally well known that there are two circuit-switched public teleprinter networks available, both of which are operated by the Western Union Company in the United States. These two networks, commonly referred to as TWX and TELEX, both provide means for utilizing teletypewriters to transmit written messages using common phone lines. TELEX and TWX teletypewriters are usually operated in conjunction with punched tape devices that use perforated paper tape to provide the opportunity to prepare and proofread messages before they are transmitted. The teletypewriter and accompanying tape perforater device are typically provided by the system operator on a rental or lease-purchase basis.

TELEX typewriters use a five channel paper tape as the input for automatic sending of messages. The tape code language is called BAUDOT and the transmission rate for TELEX machines is 66 words per minute when automatic equipment utilizes paper tape to send messages. TWX teletypewriters operate at 100 words per minute and utilize an eight channel paper tape that employs a code language commonly referred to as ASCII. The term ASCII stands for American Standard Code for Information Interchange.

In addition to the rental fees charged users for rental of the teletypewriter equipment, the service operators, such as Western Union, ITT, and RCA, charge their user customers on the basis of the amount of time required to transmit the message. In at least one instance, namely, the transmission of TWX system messages, the charge is made in full minute increments by rounding up to the next whole minute the actual time from the moment the receiving party's answer back is recorded to the moment the sender terminates the message. For example, if the total transmission time is 1.1 minutes, the time charged for sending the TWX message will be 2.0 minutes. Clearly, such rounding up to the next whole minute can result in significant additional costs to the user. By way of example, if the user were to send one international TWX or TELEX message per day, this "rounding up" procedure would add about $300.00 per year to the user's bill, assuming 260 working days, a $2.80 per minute billing rate, and a 0.45 probability factor that the message length is randomly distributed between X.1 minutes and X.9 minutes where X is any integer. This figure of $300.00 per year represents the minimum additional expense for time charges resulting from the rounding up procedure but not for time actually used for transmission of a TWX or TELEX message.

2. Prior Art

Although there are patents in the prior art which disclose devices for measuring the time required for sending a message and for measuring the length of the message to be transmitted, none of such prior art devices known to the applicant provides a suitable solution to the above-indicated problem without substantial modification and/or costly interfacing to the existing teletypewriter devices. By way of example, U.S. Pat. No. 2,150,240 to Nichols discloses a complex mechanism for the measurement of time required for the transmission of messages in a printing telegraph system. In addition, U.S. Pat. No. 2,191,798 to McCann, U.S. Pat. No. 2,481,112 to Hanley, U.S. Pat. No. 3,035,765 to Zenner et al, disclose devices relating to the broad concept of counting the time of message transmission and for displaying such time. However, no prior art devices known to the applicant discloses a portable, low-cost, microprocessor-controlled device that can accomodate both TELEX and TWX teletypewriter message systems and which can be added to such teletypewriter systems to help the operator anticipate his on-line time and avoid the aforementioned rounding up charge penalties, but without requiring significant modification to the teletypewriter.

SUMMARY OF THE INVENTION

The present invention substantially overcomes the aforementioned problem by providing the teletypewriter user with message-related information such as a continuous display of the projected "on line" time of the message as it is being prepared, that is, as it is being transformed to punched tape at the teletypewriter. With such continuous feedback of information, it is possible for the user to abbreviate, modify message structure, make format changes, eliminate answer-back operation, or send additional information to take advantage of additional "free" on line time up to the next whole minute of message time. In this way the user can avoid paying for any significant amount of unused rounded up time which would otherwise constitute message time in which no message information is sent, but for which a charge is incurred.

A preferred embodiment of the present invention consists of a microprocessor-based computer for converting each "pulse" corresponding to a character (a single column of perforation code) on the perforated tape to a sub-unit of time corresponding to the appropriate transmission rate of either TELEX or TWX. Thus, by merely checking the accompanying display, the operator may be continuously apprised of the time, in minutes and tenths of a minute, corresponding to the number of characters already punched onto the perforated tape. A keyboard provided in the preferred embodiment also provides for selection of a character mode in which the user can chose to continuously display the number of whole minutes of transmission time already exceeded by the number of characters, as well as the number of characters available to be punched on the tape prior to the next whole minute of transmission time. In addition, in the preferred embodiment to be disclosed herein, the user may preset a minimum on-line time to account for time lost during answer back and signing off which does not ordinarily constitute actual message time, but which is charged to the user. Keyboard means are also provided for selecting the appropriate message rate for either TELEX or TWX depending upon the type of system being utilized for message transmission. In the preferred embodiment herein disclosed, the invention is coupled to the teletypewriter mechanisn by means of a photosensor through which the perforated tape passes as it emanates from the tape perforating device connected to the teletypewriter. Although other coupling schemes that include a device for sensing the number of characters generated on the tape as the message preparation proceeds, would be suitable for use with the present invention the photo-sensing element of the preferred embodiment illustrates one manner in which the character-sensing signal input to the invention may be provided without requiring modification to the teletypewriter per se.

In addition to the above-indicated novel features of the present invention, the preferred embodiment described below also operates in a clock mode in which the display provides a standard real-time clock readout which may be used to provide useful information when message preparation feedback information is not desired.

OBJECTS OF THE INVENTION

It is therefore an object of the present invention to provide a tape preparation feedback device which calculates and displays the transmission time that will be required to send a message while it is being prepared for later transmission by teletypewriter exchange services such as TELEX, TWX, and the like.

It is an additional object of the present invention to provide means for the user of a teletypewriter exchange service, such as TELEX, TWX, and the like, to more efficiently utilize charged transmission time that would otherwise not be utilized for actual transmission of message information because of a whole minute round-up charge procedure.

It is still an additional object of the present invention to provide a portable low-cost message preparation timing system for operation with a teletypewriter exchange message service and that provides information for maximizing the cost efficiency of later message transmission, but without requiring modification to the teletypewriter per se.

It is still an additional object of the present invention to provide a device for displaying data related to the message time required for the transmission of teletypewriter exchange service information, and which is compatible with both TELEX and TWX paper tape code language formats and with both TELEX and TWX message data rates.

BRIEF DESCRIPTION OF THE DRAWINGS

The aforementioned objects and advantages of the present invention, as well as additional objects and advantages, will be more fully understood hereinafter as a result of the detailed description of a preferred embodiment of the invention taken in conjunction with the accompanying drawings in which.

DETAILED DESCRIPTION OF A PREFERRED EMBODIMENT

Figure 1:
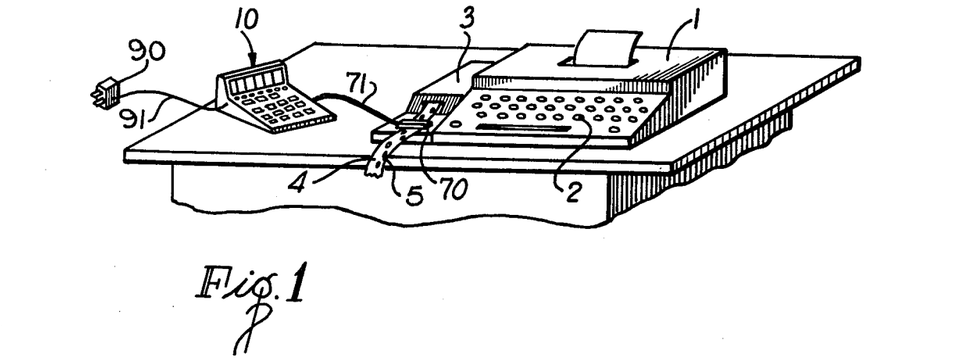
FIG. 1 is an illustration of the present invention shown in use with a teletypewriter.

Referring to FIG. 1 there is shown therein a preferred embodiment of the message preparation timing apparatus 10 of the present invention in use with a teletypewriter apparatus of the type previously described. More specifically, there is shown in FIG. 1 a teletypewriter 1 having a keyboard 2 and a tape perforating device 3 from which a tape is shown emanating. In addition to the perforation code previously alluded to, the tape 4 also includes sprocket holes 5. One such hole is aligned with each aligned set of perforations corresponding to a single character of the message to be transmitted by TELEX or TWX phone line service. Tape perforations 5 are especially suitable for use by the present invention because one such perforation occurs irrespective of the nature of the character to which it corresponds. Thus, for example, when a space is typed, which space has no message or code perforations, a tape sprocket perforation will still occur and be counted as a character for purposes of the present invention. This, of course, is appropriate because even spaces take a character time period to be transmitted and thus enter into the calculation of the transmission time charge as previously discussed.

As shown further in FIG. 1, message preparation timing apparatus 10 is adapted to respond to perforations 5 by means of a reader 70 through which the tape 4 passes as it emanates from perforater 3. Reader 70 is connected to the main housing or chassis of the invention by means of a suitable cable 71. Although the invention may be adapted to operate on battery supplied power, the preferred embodiment utilizes an AC to DC converting device 90 which in turn is adapted to be plugged into a suitable AC outlet and to generate the appropriate 5 volts DC for the described embodiment which is made available to the circuits within apparatus 10 by means of a suitable cable 91.

Figure 2:
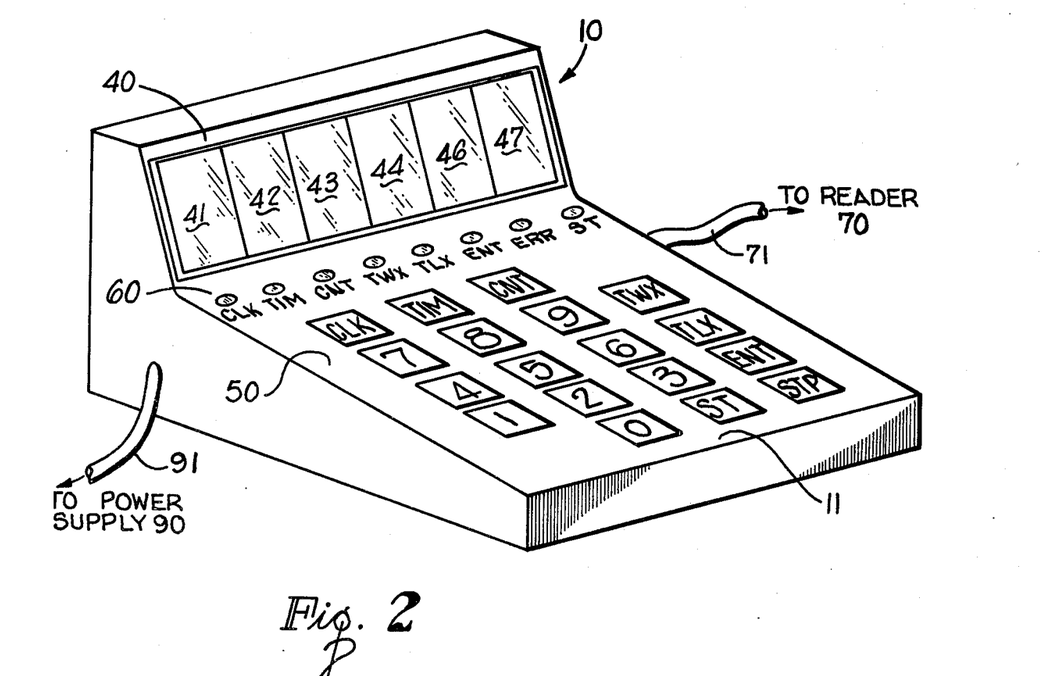
FIG. 2 is an enlarged three-dimensional view of a preferred embodiment of the invention.

Aside from the reader 70 and power supply 90 and their corresponding connector cables 71 and 91 respectively, the entire invention 10 may be housed within a calculator-like assembly or housing 11 which is shown in enlarged view in FIG. 2. As shown in FIG. 2 the exterior of housing 11 provides the user with a six-digit display 40, a specially adapted keyboard 50, and a light emitting diode array 60. Display 40 includes six eight-segment digits identified from left to right in FIG. 2 as 41, 42, 43, 44, 46, and 47, respectively. The display 40 provides the user with useful information in all three modes of operation of the invention, namely, the character mode, the timing mode, and the clock mode. In the character mode the left three digits, namely, digits 41, 42, and 43 display the number of whole minutes already equal to or exceeded by the corresponding total number of characters sensed by reader 70; and the rightmost three digits, namely, digits 44, 46, and 47 display the number of characters remaining to be added to the perforated tape before reaching the next whole minute of message time as calculated by the microcomputer of the present invention and based upon the standard rates for TWX and TELEX messages in which one minute of transmission time corresponds to 660 characters and 300 characters, respectively.

In the timing mode, the display provides a running indication of elapsed corresponding transmission time for the number of perforations of characters sensed by reader 70 and is displayed in minutes and tenths of minutes. The number of minutes are displayed in the three digits 41, 42, and 43 and the number of tenths of minutes are displayed in digit 47. Digit 46 displays a constant decimal point and digit 44 is left blank to provide the spacing between the two sets of numbers. Thus it is seen that the character and timing modes of the present invention provide two distinct means for informing the user, that is the tape preparer, with information necessary to determine, during the preparation of the perforated tape, precisely how much message time he will be charged for in either the TELEX or TWX mode of transmission.

A third mode of operation, namely, the clock mode, provides a conventional clock readout in display 40 which may be selected whenever the message preparation timing function of the present invention is not required.

Keyboard 50 provides numerical value keys 0 through 9 similar to numericl value keys provided in conventional calculator devices. However, a number of additional keys unique to the present invention are also provided; namely, three keys corresponding to the three previously described modes of operation, namely, a clock timing and character mode key; two keys for selecting the transmission rate, namely, a TWX key and a TELEX key; and three additional function keys, namely, a START key, a STOP key, and an ENTER key.

LED display 60 includes a plurality of light emitting diodes each assigned to a particular function indication providing the user with additional information regarding the status of the invention; namely, indications of clock, timing, and character mode selection; TWX and TELEX transmission rates and the functions ENTER and STOP as well as an additional indication of whether an error has been generated by some false or unacceptable entry at the keyboard. The particular purpose and function of each key of keyboard 50 and of each LED of array 60 will be more fully understood hereinafter in conjunction with the detailed description of the structure and operation of the invention.

Figure 3:
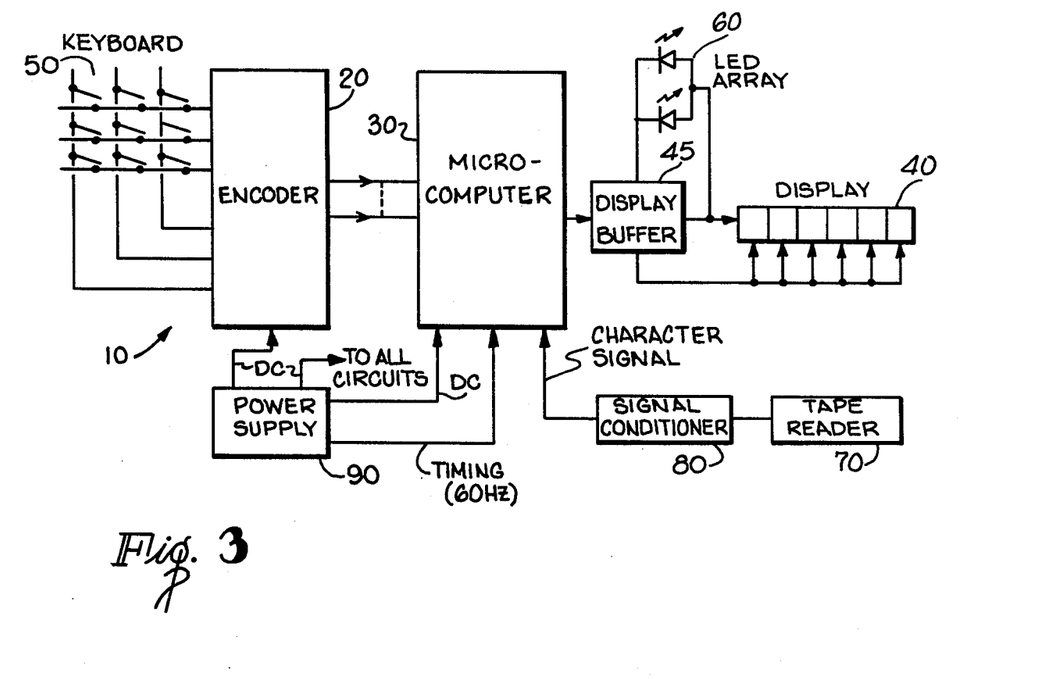
FIG. 3 is a block diagram illustration of the preferred embodiment of the invention.
Figure 4:
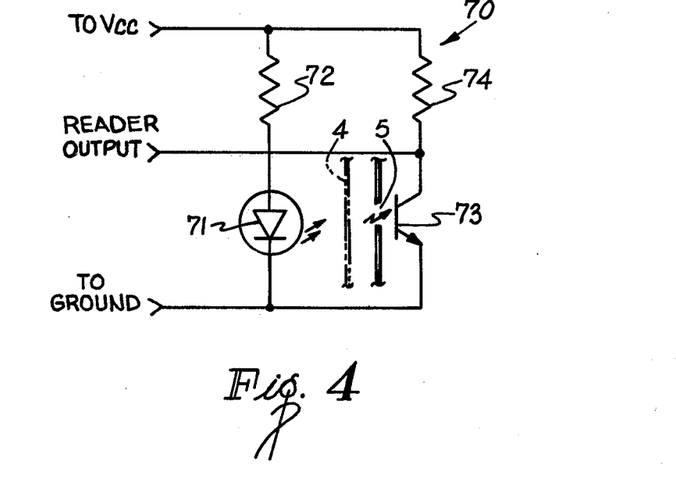
FIG. 4 is a schematic diagram of a tape perforation reader used in the preferred embodiment.
Figure 5:
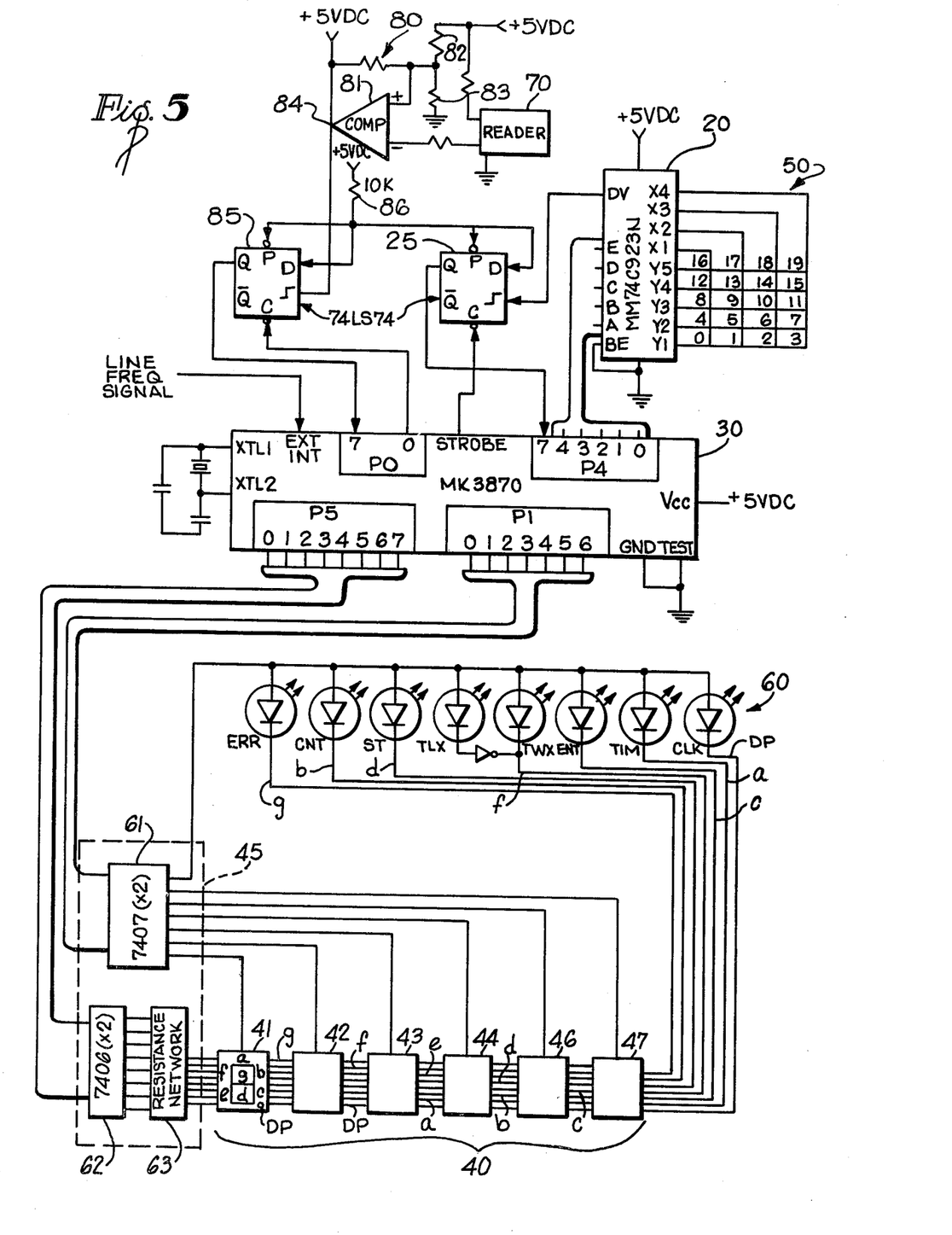
FIG. 5 is a schematic diagram of the preferred embodiment of the invention.

The detailed structure of the present invention may be more fully understood by reference to FIGS. 3 through 5 of which FIG. 3 is a block diagram in which it may be seen that the present invention is a microcomputer or microprocessor-based system comprising an encoder 20, a microcomputer 30, a display 40, a display buffer 45, a keyboard 50, an LED array 60, a tape reader 70, a signal conditioner 80, and a suitable power supply 90. In a preferred embodiment of the present invention, microcomputer 30 is a complete 8-bit microcomputer on a single MOS integrated circuit chip which provides 2048 bytes of read only memory (ROM), 64 bytes of scratch pad random access memory (RAM), a programmable binary timer, 32 bits of input/output, and a single +5 volt DC power supply requirement. In the preferred embodiment of the present invention it has been found preferable to utilize the MK3870 microcomputer.

Keyboard 50 is connected to the microcomputer 30 by means of an encoder 20 such as a National Semiconductor model MM74C923 20-key encoder which provides an internal register which in effect remembers the last key pressed even after the key is released.

Another input to the microcomputer 30 is a signal derived from tape reader 70, which signal passes through signal conditioner 80 to provide the microcomputer with a character signal each time a sprocket perforation 5 is sensed by the tape reader. Microcomputer 30 provides output signals to a display buffer 45 which is in turn connected to both LED array 60 and display 40 for strobe operation of those indicating devices in a manner to be more fully understood from the detailed schematic diagram of FIG. 5 which will be described below. One additional block in FIG. 3 is power supply 90 which provides DC voltage power to all of the circuits of the invention. In addition, a 60 Hz. timing signal derived from the AC line source is supplied by the power supply 90 to the microcomputer 30 to provide the time base for the clock mode of operation which will also be more fully described below.

The remaining detail structural features of the present invention will now be described in conjunction with the circuit diagrams of FIGS. 4 and 5.

Referring now to FIG. 4 it will be observed that a reader circuit 70 of a preferred embodiment of the invention consists of a light emitting diode 71 in series with a resistor 72, both of which are in parallel with a photosensor 73 which is, in turn, in series with a resistor 74. When the light emitting diode 71, acting as a light transmitter, is activated by current flowing through bias resistor 72, an infrared light beam is emitted. If any object is located between LED 71 and photosensor 73, such as semi-opaque paper tape 4, the beam power incident at photosensor 73 is substantially attenuated or entirely eliminated. In this mode photosensor 73 is in an off state and the signal at the output terminal is at a voltage level substantially equal to +5 volts DC. However, as a perforation 5 on paper tape 4 passes in front of the beam emitted by LED 71, the beam reaches photosensor 73 without attenuation causing photosensor 73 to turn on thereby pulling the output signal voltage available at the output terminal toward ground potential.

It will of course be recognized that the passage of perforated tape 4 through the beam emitted by LED 71 is relatively slow in an electrical period sense. Accordingly, the variation in output voltage at the output terminal of reader 70 consists of a series of pulses of relatively slow rise and fall times that may vary significantly with the mechanical action of the tape perforater 3 in advancing tape 4 as it emanates from the perforater. For this reason, the output signal from the tape reader 70 is modified by signal conditioner 80 which, as will be hereinafter more fully understood in conjunction with FIG. 5, acts on the output pulses provided at the output terminal of reader 70 to provide cleaner pulses of relatively short rise and fall times. One such clean pulse is generated for each tape perforation 5 sensed by reader 70.

Referring now to FIG. 5 which is a detailed schematic of the invention, it will be seen at the top-most portion thereof that the output terminal of reader 70 is connected to the negative input terminal of a comparator 81 which forms part of the signal conditioner 80. The positive input terminal of comparator 81 receives a positive voltage derived from the voltage dividing resistor network consisting of resistors 82 and 83 which are connected in series between +5 volts DC and ground potential. This positive voltage is adjusted so that it is equal to the output voltage of the reader when no perforation is being sensed so that the output signal at terminal 84 of comparator 81 is substantially zero volts DC. However, when the reader output potential is reduced to substantially zero volts DC, which occurs when a perforation 5 passes through the beam of light transmitted by LED 71 of FIG. 4, the output voltage at the negative input terminal of comparator 81 suddenly drops to close to zero volts DC and the voltage difference between positive and negative terminals input to comparator 81 produces a positive going output signal at terminal 84.

As shown in FIG. 5, the output terminal 84 of comparator 81 is connected to the clock terminal of a D-type positive edge triggered flip flop 85 of which the preset and data terminals are electrically connected to +5 volts DC through a suitably valued voltage drop resistor 86. Those familiar with the electronics art and more specifically with logic circuits will recognize that with the preset and data terminals tied permanently to a high voltage level, the positive going edge of the signal applied to the clock terminal of flip flop 85 causes the Q output to generate a high or positive voltage level whenever the clear terminal is also high. In effect, therefore, flip flop 85 constitutes a single bit register which stores the reader pulse conditioned by signal conditioner 80 for presentation to microcomputer 30 to indicate that a sprocket hole 5 on tape 4 has passed through the beam in the reader 70, at a suitable point in the cycle of operation of microcomputer 30.

Still referring to the top-most portion of FIG. 5 it will be seen that keyboard 50 is electrically connected to encoder 20. Each key thereof is schematically represented by the intersection of an electrical row, coded Y1 through Y5, and an electrical column, coded X1 through X4, respectively. Each such intersection, is, in addition, numbered on the keyboard schematically wherein numbers 0 through 19 represent the twenty keyboard contacts of keyboard 50. Encoder 20 is adapted to produce a binary representation at its output terminals, A through E, corresponding to the appropriate combination of row (Y) and column (X) intersection for the particular key that has been depressed. At the data available terminal DV on the left side of encoder 20, a data available output voltage goes to a high level when a valid keyboard entry has been made. The data available output voltage returns to a low level when the entered key is released even if another key is depressed. The data available output signal will return high to indicate acceptance of the depressed key after a normal debounce period. The signal at the data available terminal DV is transferred to the clock terminal of a second positive edge triggered flip flop 25 of which the preset and data terminals are also connected to +5 volts DC through resistor 86.

Thus, flip flop 25 also acts as a single bit register which stores the data available signal and provides a high level at the Q output terminal available to the microcomputer 30 whenever the clear terminal of the flip flop 25 receives a high voltage signal generated at the strobe output terminal of microcomputer 30 as shown in FIG. 5. A high output voltage, available at output terminal Q of flip flop 25, informs microcomputer 30 that a new key has been depressed for which a corresponding binary code is available at output terminals A through E of encoder 20, which code is presented to the microcomputer at terminals 0, 1, 2, 3, and 4 of port P4. In a preferred embodiment of the invention, flip flops 25 and 85 are provided on a single dual D-type positive edge triggered flip flop chip such as a Texas Instruments Model 74LS74.

Thus, it is seen that the keyboard 50 and reader 70 combined with suitable encoder and conditioning circuits, respectively, provide the primary data inputs to microcomputer 30. Additional inputs to the microcomputer include a timing signal derived from the alternating current line frequency which is applied to the EXT/INT terminal, the +5 volts DC voltage level applied to the VCC terminal, and ground potential applied to the GND and TEST terminals. In addition, a crystal of suitable characteristics and associated capacitor circuit are connected to terminals XTL1 and XTL2 to provide suitable timing control (1 MHz.) for microcomputer operations. The line frequency signal derived from the AC source provides a 60 cycle per second reference pulse for the clock operation of the invention and is input at the EXT/INT (External Interrupt) terminal of microcomputer 30.

The output signals derived from microcomputer 30 from ports P1 and P5 are indicated in the lower portion of FIG. 5 and are applied to display 40 and LED array 60 as described below. It will be recognized by those familiar with the art to which the present invention pertains that the individual LEDs of LED array 60 are electrically interconnected as a seventh digit of display 50 and that the entire assembly is activated for appropriate display by means of a combination of segment signals derived from microcomputer port P5 and strobe signals derived from microcomputer port P1. This combined segment and strobe activation of the 6 digits of display 40 and the equivalent seventh digit comprising the LEDs of array 60, is performed in a well known manner which need not be described in detail herein except to point out that the segment and strobe signals are amplified by means of circuits within display buffer 45. Buffer 45 includes a plurality of non-inverting buffer drivers 61 embodied within a pair of TTL circuit chips such as Texas Instruments Model 7407 hex buffer drivers. In addition, display buffer 45 includes a plurality of inverter buffer drivers 62 connected in series with resistors within resistor network 63 through which the segment signals pass to the digits of display 40 and the LEDs of array 60. The plurality of inverter buffer drivers 62 may be embodied within a pair of hex inverter buffer driver TTL circuit chips such as Texas Instruments Model 7406.

The structural configuration of the invention will now be fully understood as a result of the above description of FIGS. 1 through 5. However, the manner in which the invention operates upon the input and output data signals described above, depends upon the binary data contained within the 16 Kbits of memory within microcomputer 30 which constitute the program contained therein. The program is disclosed herein in full by means of a combination of a detail listing in Table I as well as a representative flow chart thereof comprising FIGS. 6 and 7. A detailed description of the instructions employed in the program, as well as of the operation and implementation of a suitable microcomputer 30, may be found in the book entitled "MOSTEK 1979 Microcomputer Data Book" by Mostek Corporation, June 1979; and more specifically at pages 327-432 thereof.

TABLE I

PROGRAM LISTING

| ROM ADDRESS | ROM CODE | IDENTIFICATION | INSTRUCTION CODE | OPERAND | COMMENTS |
|---|---|---|---|---|---|
| 0000 | 1A | A0 | DI | | |
| 0001 | 70 | | CLR | | CLEAR I/O PORTS |
| 0002 | B0 | | OUTS | P0 | |
| 0003 | 79 | | LIS | 9 | CLEAR D-F/F AND DISPLAY |
| 0004 | B0 | | OUTS | P1 | |
| 0005 | 70 | | CLR | | CLEAR SCRATCH-PAD |
| 0006 | 0B | A1 | LR | IS, A | |
| 0007 | 70 | | CLR | | |
| 0008 | 5C | | LR | S, A | |
| 0009 | 0A | | LR | A, IS | |
| 000A | 24C1 | | AI | H'C1' | |
| 000C | 94F0 | | BNZ | A1 | |
| 000E | 71 | | LIS | 1 | SET SEC. FLAG |
| 000F | 53 | | LR | SEC, A | |
| 0010 | 54 | | LR | DL1, A | SET DELAYS 1 AND 2 |
| 0011 | 55 | | LR | DL2, A | |
| 0012 | 56 | | LR | S1, A | SET S1 AND S2 |
| 0013 | 2066 | | LI | H'66' | |
| 0015 | 57 | | LR | S2, A | |
| 0016 | 2041 | | LI | H'41' | SET INTERRUPT ADDRESS |
| 0018 | BC | | OUTS | PC | |
| 0019 | 20A0 | | LI | H'A0' | |
| 001B | BD | | OUTS | PD | |
| 001C | 70 | | LIS | 0 | |
| 001D | BE | | OUTS | PE | |
| 001E | 1B | | EI | | |
| 0020 | 72 | B0 | LIS | 2 | GET CTRL |
| 0021 | B0 | | OUTS | P0 | |
| 0022 | 2B | | NOP | | |
| 0023 | A1 | | INS | P1 | |
| 0024 | 18 | | COM | | |
| 0025 | 50 | | LR | P, A | |
| 0026 | 70 | | CLR | | |
| 0027 | B0 | | OUTS | P0 | |
| 0028 | A0 | | INS | P0 | |
| 0029 | 13 | | SL | 1 | |
| 002A | 9171 | | BM | C0 | −, CLOCK SET |
| 002C | 63 | | LISU | CT1 | |
| 002D | 13 | | SL | 1 | |
| 002E | 8107 | | BP | B1 | +, COUNT-OFF |
| 0030 | 41 | | LR | A, FL | ENABLE COUNTER |
| 0031 | 2202 | | OI | 2 | |
| 0033 | 51 | | LR | FL, A | |
| 0034 | 906B | | BR | D0 | |
| 0036 | 72 | B1 | LIS | | DISABLE COUNTER |
| 0037 | F1 | | NS | FL | |
| 0038 | 51 | | LR | FL, A | |
| 0039 | 6F | | LISL | F | |
| 003A | 70 | | CLR | | |
| 003B | E0 | | XS | P | |
| 003C | 9120 | | BM | B4 | −, RESET |
| 003E | 73 | | LIS | 3 | |
| 003F | F0 | | NS | P | |
| 0040 | 8418 | | BZ | B3 | 0, SLOW/FAST NOT SET |
| 0042 | 34 | | DS | DL1 | |
| 0043 | 945C | | BNZ | D0 | −0, DELAY 1 NOT OVER |
| 0045 | 2080 | | LI | H'80' | RESET DELAY 1 |
| 0047 | 54 | | LR | DL1, A | |
| 0048 | 35 | | DS | DL2 | |
| 0049 | 9456 | | BNZ | D0 | −0, DELAY 2 NOT OVER |
| 004B | 71 | | LIS | 1 | RESET DELAY 2 |
| 004C | F0 | | NS | P | |
| 004D | 71 | | LIS | 1 | |
| 004E | 9402 | | BNZ | B2 | −0, FAST |
| 0050 | 74 | | LIS | 4 | SLOW |
| 0051 | 55 | B2 | LR | DL2, A | |
| 0052 | 41 | | LR | A, FL | SET F/S FLAG |
| 0053 | 2201 | | OI | 1 | |
| 0055 | 51 | | LR | FL, A | |
| 0056 | 29016C | | JMP | F1 | |
| 0059 | 78 | B3 | LIS | 8 | |
| 005A | F0 | | NS | P | |
| 005B | 8444 | | BZ | D0 | 0, LOAD NOT SET |
| 005D | 40 | B4 | LR | A, P | SET BAUD RATE |
| 005E | 12 | | SR | 1 | |
| 005F | 15 | | SL | 4 | |
| 0060 | 47 | | LR | A, S2 | |
| 0061 | 9103 | | BM | B5 | −, BAUD OF 110 |
| 0063 | 73 | | LIS | 3 | BAUD OF 50 |

TABLE I-continued
PROGRAM LISTING

| ROM ADDRESS | ROM CODE | IDENTIFICATION | INSTRUCTION CODE | OPERAND | COMMENTS |
|---|---|---|---|---|---|
| 0064 | 15 | | SL | 4 | |
| 0065 | 58 | B5 | LR | BD, A | |
| 0066 | 15 | | SL | 4 | RESET DISPLAY |
| 0067 | 5E | | LR | D, A | |
| 0068 | 48 | | LR | A, BD | |
| 0069 | 14 | | SR | 4 | |
| 006A | 5E | | LR | D, A | |
| 006B | 70 | | CLR | | |
| 006C | 5C | | LR | S, A | |
| 006D | 6F | | LISL | F | SET BAUD RATE DISPLAY |
| 006E | 48 | | LR | A, BD | |
| 006F | 15 | | SL | 4 | |
| 0070 | 75 | | LIS | 5 | |
| 0071 | 9402 | | BNZ | B6 | |
| 0073 | 74 | | LIS | 4 | |
| 0074 | 18 | B6 | COM | | |
| 0075 | 64 | | LISU | CT2 | |
| 0076 | 5E | | LR | D, A | |
| 0077 | 63 | | LISU | CT1 | |
| 0078 | 15 | | SL | 4 | |
| 0079 | EC | | XS | S | |
| 007A | 5D | | LR | I, A | |
| 007B | 78 | | LIS | 8 | |
| 007C | F0 | | NS | P | |
| 007D | 8422 | | BZ | D0 | 0, LOAD NOT SET |
| 007F | 74 | | LIS | 4 | GET LOAD NUMBER |
| 0080 | B0 | | OUTS | P0 | |
| 0081 | 2B | | NOP | | |
| 0082 | A1 | | INS | P1 | |
| 0083 | 18 | | COM | | |
| 0084 | 840F | | BZ | B8 | 0, LOAD NUMBER ZERO |
| 0086 | 5A | | LR | HU, A | |
| 0087 | 18 | | COM | | |
| 0088 | 1F | | INC | | |
| 0089 | CC | | AS | S | |
| 008A | 8203 | | BC | B7 | |
| 008C | 6E | | LISL | E | |
| 008D | 3D | | DS | I | |
| 008E | 4A | B7 | LR | A, HU | |
| 008F | 18 | | COM | | |
| 0090 | DC | | ASD | S | |
| 0091 | C7 | | AS | S2 | |
| 0092 | D6 | | ASD | S1 | |
| 0093 | 5C | | LR | S, A | |
| 0094 | 70 | B8 | CLR | | |
| 0095 | B0 | | OUTS | P0 | |
| 0096 | 9009 | B9 | BR | D0 | |
| 0098 | | | | | |
| 009C | 9043 | | BR | C0 | |
| 00A0 | 74 | D0 | LIS | 4 | |
| 00A1 | F0 | | NS | P | |
| 00A2 | 842A | | BZ | D4 | 0, COUNT 2 SET |
| 00A4 | 6F | | LISL | F | |
| 00A5 | 4E | | LR | A, D | |
| 00A6 | 12 | | SR | 1 | |
| 00A7 | 5B | | LR | HL, A | |
| 00A8 | 7F | | LIS | H'OF' | |
| 00A9 | FC | | NS | S | |
| 00AA | 12 | | SR | 1 | |
| 00AB | 5A | | LR | HH, A | |
| 00AC | 71 | | LIS | 1 | |
| 00AD | FE | | NS | D | |
| 00AE | 8405 | | BZ | D1 | |
| 00B0 | 4B | | LR | A, HL | |
| 00B1 | 2280 | | OI | H'80' | |
| 00B3 | 5B | | LR | HL, A | |
| 00B4 | 48 | D1 | LR | A, BD | SET DATA COUNTER ADDRESS |
| 00B5 | 15 | | SL | 4 | |
| 00B6 | 4A | | LR | A, HU | |
| 00B7 | 8403 | | BZ | D2 | |
| 00B9 | 2402 | | AI | H'02' | |
| 00BB | 2442 | D2 | AI | H'42' | |
| 00BD | 5A | | LR | HU, A | |
| 00BE | 10 | | LR | DC, A | |
| 00BF | 4C | | LR | A, S | |
| 00C0 | 64 | | LISU | CT | |
| 00C1 | 5D | | LR | I, A | |
| 00C2 | 16 | | LM | | |
| 00C3 | 25FF | | CI | H'FF' | |

TABLE I-continued
PROGRAM LISTING

| ROM ADDRESS | ROM CODE | IDENTIFICATION | INSTRUCTION CODE | OPERAND | COMMENTS |
|---|---|---|---|---|---|
| 00C5 | 9406 | | BNZ | D3 | |
| 00C7 | 70 | | CLR | | |
| 00C8 | 5E | | LR | A, D | |
| 00C9 | 71 | | LIS | 1 | |
| 00CA | C7 | | AS | S2 | |
| 00CB | DC | | ASD | S | |
| 00CC | 5C | D3 | LR | S, A | |
| 00CD | 9062 | D4 | BR | E0 | |
| 00CF | | | | | |
| 00E0 | 62 | C0 | LISU | CK | |
| 00E1 | 13 | | SL | 1 | |
| 00E2 | 13 | | SL | 1 | |
| 00E3 | 8105 | | BP | C1 | +, STOP CLOCK |
| 00E5 | 71 | | LIS | 1 | ENABLE CLOCK |
| 00E6 | BE | | OUTS | PE | |
| 00E7 | 9048 | | BR | E0 | |
| 00E9 | 70 | C1 | CLR | | DISABLE CLOCK |
| 00EA | BE | | OUTS | PE | |
| 00EB | 203C | | LI | H' | RESET SEC |
| 00ED | 53 | | LR | SEC, A | |
| 00EE | 6F | | LISL | F | |
| 00EF | 40 | | LR | A, P | |
| 00F0 | 13 | | SL | 1 | |
| 00F1 | 8107 | | BP | C2 | +, RESET NOT SET |
| 00F3 | 70 | | CLR | | RESET CLOCK DISPLAY |
| 00F4 | 5E | | LR | D, A | |
| 00F5 | 5E | | LR | D, A | |
| 00F6 | 5C | | LR | S, A | |
| 00F7 | 9038 | | BR | E0 | |
| 00F9 | 73 | C2 | LIS | 3 | |
| 00FA | F0 | | NS | P | |
| 00FB | 8434 | | BZ | E0 | 0, SLOW/FAST NOT SET |
| 00FD | 34 | | DS | DL1 | |
| 00FE | 9431 | | BNZ | E0 | −0, DELAY NOT OVER |
| 0100 | 71 | | LIS | 1 | RESET DELAY 2 |
| 0101 | F0 | | NS | P | |
| 0102 | 71 | | LIS | 1 | |
| 0103 | 9403 | | BNZ | C3 | −0, FAST |
| 0105 | 20FF | | LI | H'FF' | SLOW |
| 0107 | 54 | C3 | LR | DL2, A | |
| 0108 | 0A | | LR | A, IS | |
| 0109 | 07 | | LR | QV, A | |
| 010A | 1A | | DI | | |
| 010B | 09 | | LR | P, A | |
| 010C | 290130 | | JMP | E0 | |
| 1008 | 71 | | LIS | 1 | |
| 1009 | C7 | | AS | S2 | |
| 100A | DC | | ASD | S | |
| 100B | 2560 | | CI | H'60' | |
| 100D | 9414 | | BNZ | C4 | |
| 100F | 70 | | CLR | | |
| 1010 | 5E | | LR | D, S | |
| 1011 | 71 | | LIS | 1 | |
| 1012 | C7 | | AS | S2 | |
| 1013 | DC | | ASD | S | |
| 1014 | 2560 | | CI | H'60' | |
| 1016 | 940B | | BNZ | C4 | |
| 1018 | 70 | | CLR | | |
| 1019 | 5E | | LR | D, S | |
| 101A | 71 | | LIS | 1 | |
| 101B | C7 | | AS | S2 | |
| 101C | DC | | ASD | S | |
| 101D | 2513 | | CI | H'13' | |
| 101F | 9402 | | BNZ | C4 | |
| 1021 | 71 | | LIS | 1 | |
| 1022 | 5C | C4 | LR | S, A | |
| 1023 | 900C | | BR | E0 | |
| 1030 | 42 | E0 | LR | A, DR | SET ISAR |
| 1031 | 12 | | SR | 1 | |
| 1032 | 9404 | | BNZ | E1 | |
| 1034 | 6F | | LISL | F | |
| 1035 | 9008 | | BR | E3 | |
| 1037 | 12 | E1 | SR | 1 | |
| 1038 | 9404 | | BNZ | E2 | |
| 103A | 6E | | LISL | E | |
| 103B | 9002 | | BR | E3 | |
| 103D | 6D | E2 | LISL | D | |
| 103E | 71 | E3 | LIS | 1 | |
| 103F | F2 | | NS | DR | |

TABLE I-continued

PROGRAM LISTING

| ROM ADDRESS | ROM CODE | IDENTIFICATION | INSTRUCTION CODE | OPERAND | COMMENTS |
|---|---|---|---|---|---|
| 1040 | 4C | | LR | A, S | |
| 1041 | 8402 | | BZ | E4 | 0, RIGHT CHAR |
| 1043 | 14 | | SR | 4 | LEFT CHAR |
| 1044 | 15 | E4 | SL | 4 | OUTPUT NUMBER |
| 1045 | E2 | | XS | DR | |
| 1046 | B1 | | OUTS | P1 | |
| 1047 | 71 | | LIS | 1 | ENABLE LATCH |
| 1048 | B0 | | OUTS | P0 | |
| 1049 | 70 | | CLR | | |
| 104A | B0 | | OUTS | P0 | |
| 104B | B1 | | OUTS | P1 | |
| 104C | | | EI (nop) | | |
| 104D | 32 | | DS | DR | DECR DISPLAY ROW FLAG |
| 104E | 8112 | | BP | F0 | |
| 1050 | 75 | | LIS | 5 | RESET DISPLAY ROW FLAG |
| 1051 | 52 | | LR | DS, A | |
| 1052 | 900E | | BR | F0 | |
| 1060 | A0 | F0 | INS | P0 | |
| 1061 | 8134 | | BP | F4 | +, NO RDR SIGNAL |
| 1063 | 78 | | LIS | 8 | CLEAR RDR LATCH |
| 1064 | B0 | | OUTS | P0 | |
| 1065 | 70 | | CLR | | |
| 1066 | B0 | | OUTS | P0 | |
| 1067 | 72 | | LIS | 2 | |
| 1068 | F1 | | NS | FL | |
| 1069 | 842C | | BZ | F4 | 0, COUNT DISABLED |
| 106B | 63 | | LISU | CT1 | |
| 106C | 6F | F1 | LISL | F | |
| 106D | 71 | | LIS | 1 | |
| 106E | 18 | | COM | | |
| 106F | DC | | ASD | S | |
| 1070 | C7 | | AS | S2 | |
| 1071 | D6 | | ASD | S1 | |
| 1072 | 5E | | LR | D, A | |
| 1073 | 2599 | | CI | H'99' | |
| 1075 | 9404 | | BNZ | F2 | |
| 1077 | 3C | | DS | S | |
| 1078 | 9014 | | BR | F3 | |
| 107A | 2500 | F2 | CI | H'00' | |
| 107C | 9410 | | BNZ | F3 | |
| 107E | 7F | | LIS | H'0F' | |
| 107F | FD | | NS | I | |
| 1080 | 940C | | BNZ | F3 | |
| 1082 | 48 | | LR | A, BD | |
| 1083 | 15 | | SL | 4 | |
| 1084 | 5E | | LR | D, A | |
| 1085 | 48 | | LR | A, BD | |
| 1086 | 14 | | SR | 4 | |
| 1087 | EC | | XS | C | |
| 1088 | 5E | | LR | D, A | |
| 1089 | 71 | | LIS | 1 | |
| 108A | C7 | | AS | S2 | |
| 108B | DC | | ASD | S | |
| 108C | 5C | | LR | S, A | |
| 108D | 71 | F3 | LIS | 1 | |
| 108E | F4 | | NS | FL | |
| 108F | 8406 | | BZ | F4 | |
| 1091 | E1 | | XS | FL | |
| 1092 | 51 | | LR | FL, A | |
| 1093 | 2940A0 | | JMP | D0 | |
| 1096 | 294020 | F4 | JMP | B0 | |
| 10A0 | 1E | I0 | LR | J, W | |
| 10A1 | 06 | | LR | QV, A | |
| 10A2 | 33 | | DS | SEC | |
| 10A3 | 9425 | | BNZ | I4 | |
| 10A5 | 203C | | LI | H'3C' | |
| 10A7 | 53 | | LR | SEC, A | |
| 10A8 | 0A | | LR | A, IS | |
| 10A9 | 07 | | LR | QL, A | |
| 10AA | 62 | | LISU | CK | |
| 10AB | 6F | I1 | LISL | F | |
| 10AC | 71 | | LIS | 1 | SEC |
| 10AD | C7 | | AS | S2 | |
| 10AE | DC | | ASD | S | |
| 10AF | 2560 | | CI | H'60' | |
| 10B1 | 9414 | | BNZ | I3 | |
| 10B3 | 70 | | CLR | | MIN |
| 10B4 | 5E | | LR | D, A | |
| 10B5 | 71 | | LIS | 1 | |

TABLE I-continued

| ROM ADDRESS | ROM CODE | IDENTIFICATION | PROGRAM LISTING INSTRUCTION CODE | OPERAND | COMMENTS |
|---|---|---|---|---|---|
| 10B6 | C7 | | AS | S2 | |
| 10B7 | DC | | ASD | S | |
| 10B8 | 2560 | | CI | H'60' | |
| 10BA | 940B | | BNZ | I3 | |
| 10BC | 70 | | CLR | | HR |
| 10BD | 5E | | LR | D, A | |
| 10BE | 71 | | LIS | 1 | |
| 10BF | C7 | | AS | S2 | |
| 10C0 | DC | | ASD | S | |
| 10C1 | 2513 | | CI | H'13' | |
| 10C3 | 9402 | | BNZ | I3 | |
| 10C5 | 71 | | LIS | 1 | |
| 10C6 | 5C | I3 | LR | S, A | |
| 10C7 | 03 | | LR | A, QL | |
| 10C8 | 0B | | LR | IS, A | |
| 10C9 | 02 | I4 | LR | A, QU | |
| 10CA | 1D | | LR | W, J | |
| 10CB | 1B | | EI | | |
| 10CC | 1C | | POP | | |

Figure 6:
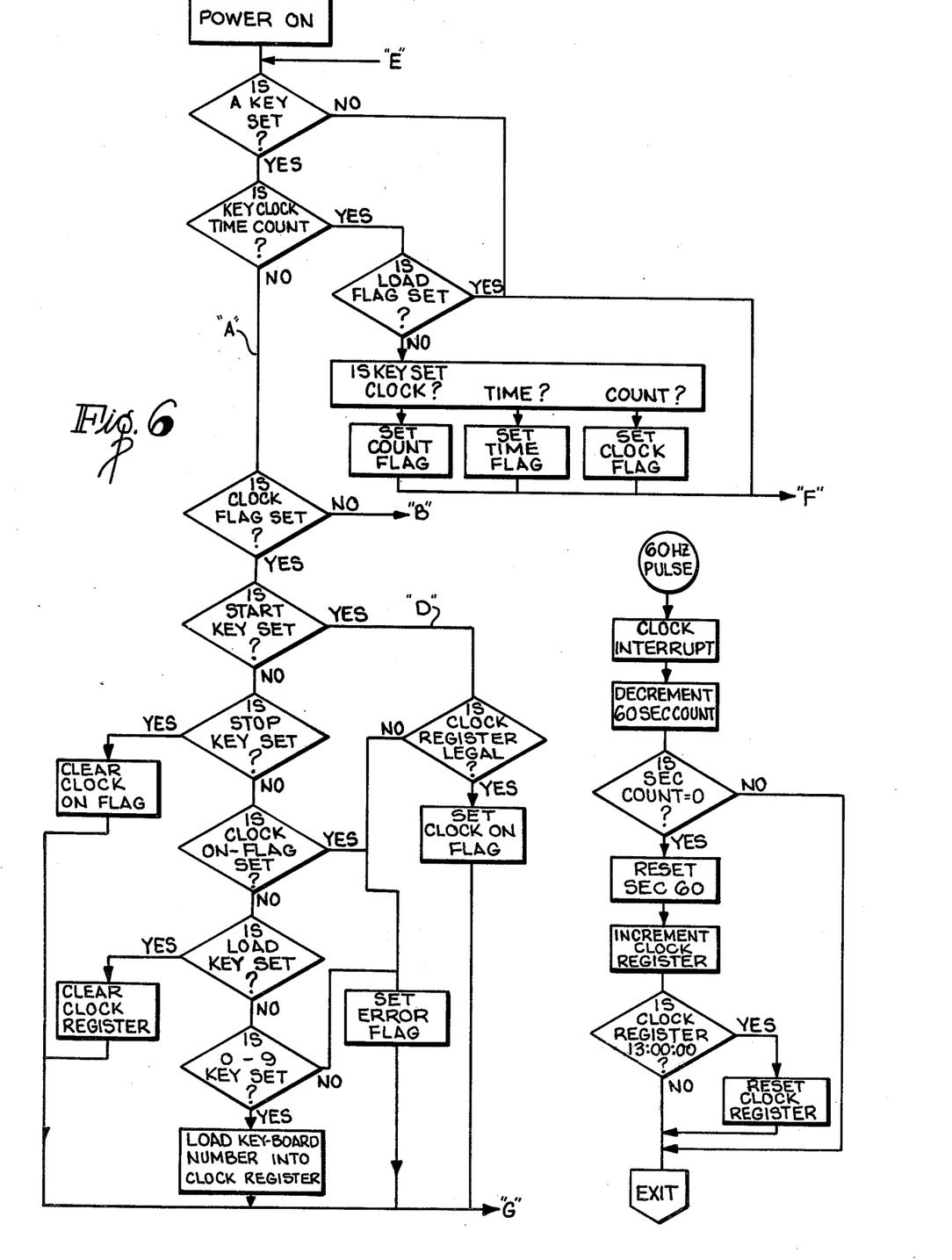
FIGS. 6 and 7 provide a flow chart representation of the computer program routine used in the present invention.
Figure 7:
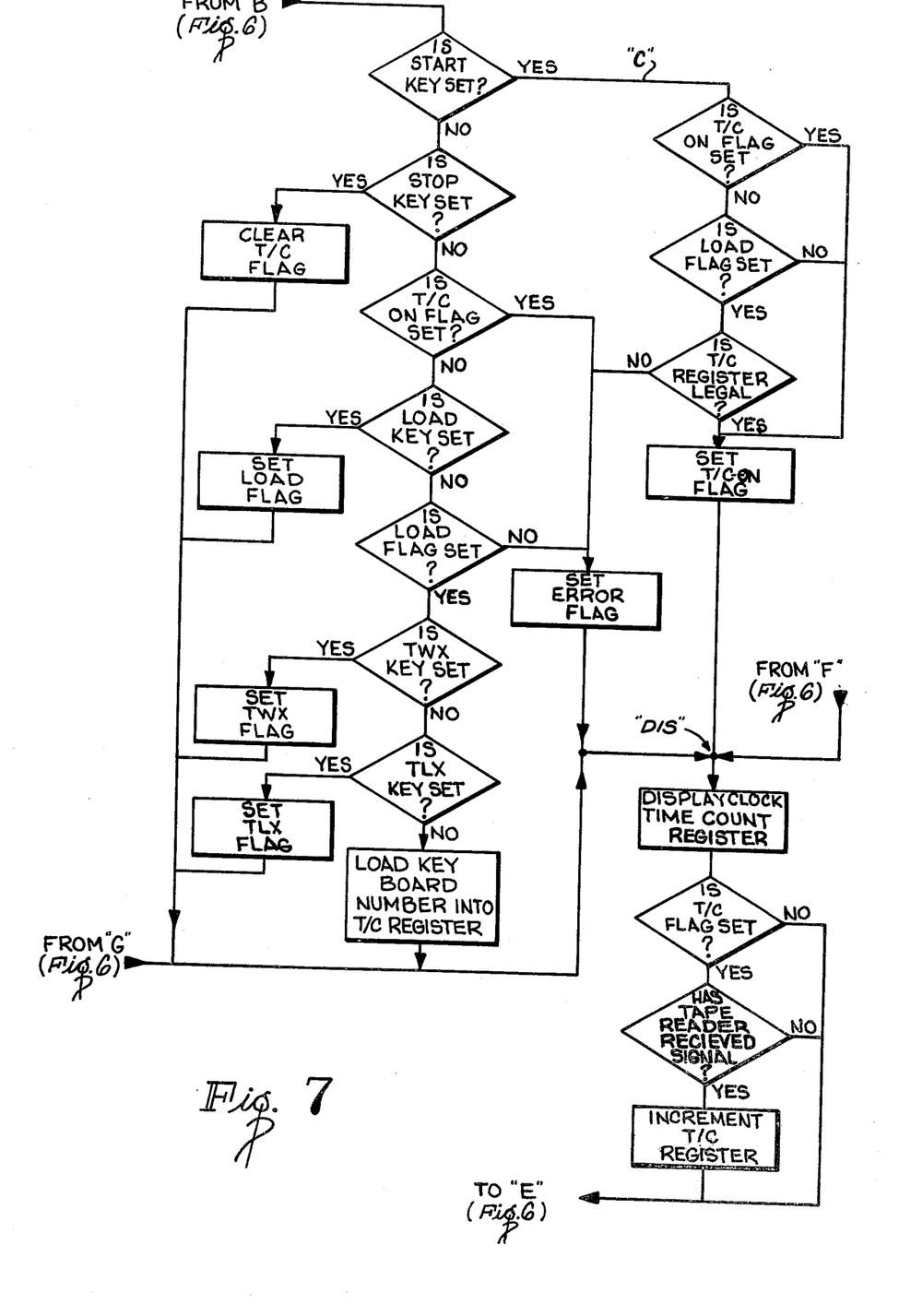

Referring now to FIGS. 6 and 7 which together comprise a flow chart representation of the program carried out by the present invention, it will be seen that when the power is applied to the invention by way of power supply 90 the first program step carried out by microcomputer 30 is to determine whether or not a key has been depressed at keyboard 50. If no key has been depressed the program branches to the display and read sub-routine at junction "DIS" in FIG. 7. In the display and read sub-routine, hereafter referred to as the DIS routine, the contents of the count, time, or clock registers are first displayed and the program then checks to determine whether a time flag or count flag has been set and whether a tape reader signal has been received before returning to the key depression test. If a time flag or count flag has been set and a tape reader signal has been received, the program increments the time/count register before returning to the key test step in the program.

If, during the key test, encoder 20 indicates to microcomputer 30 that a key has been depressed, the next step in the program is to determine whether the key that has been depressed is either the clock, time, or count keys that pertain to the three possible modes of operation as previously described. If one of these three mode keys has been depressed the program then determines whether or not the load flag has been set which setting will occur when the enter key has also been depressed. If the enter key has been depressed and, as a result, the load flag has been previously set, the program again branches to the DIS routine as previously described. On the other hand, if the load flag set test indicates that the enter key has not yet been depressed, the program then performs the step of determining which of the mode keys have been depressed, the clock, time, or count key and sets the appropriate flag corresponding to that mode key before the program branches to the DIS routine.

If the test to determine whether or not the last key depressed is the count, time, or clock key yields a negative result, path "A" is followed and the routine next performs a test to determine whether the clock flag has been set. If the clock flag has not been set this indicates that the mode in which the invention is about to operate will be either the time mode or count mode as previously described. Accordingly, the program proceeds along path "B" to determine which mode (time or count) is to be put into effect and what is the current status with respect to operating in either of those two modes. As shown at the top-most portion of FIG. 7 at path "B", this begins with a test to determine whether the key START has been depressed. If the START key has been depressed, the program proceeds along the path labeled "C" to determine whether or not the T/C-ON flag (time or count on flag) has been set. If the time or count flag has been set, the program then sets the time or count on flag and proceeds to the the DIS routine as described above. If the TC-ON flag has not been set, the program then determines whether or not the load flag has been set. If the load flag has not been set, the time or count on flag is set and the program performs the DIS routine. If the load flag has been set, the program determines whether the contents of the time or count register are legal. The contents of the time or count register are illegal if the time register contains 60 seconds or more or if the count register contains a number equal to or larger than the total number of characters in one whole minute of transmission for the transmission rate selected, namely, TELEX or TWX. If the contents of both registers are legal, the time or count on flag is set and the program proceeds to the DIS routine. If the register contents are illegal, the program proceeds to the set error flag operation before proceeding to the DIS routine whereby the error indicating LED ERR is illuminated to inform the user of the error status.

If during the START key set test (at the top of FIG. 7) it is determined that the START key has not been depressed, instead of following the path labeled "C", the program proceeds to determine whether the STOP key has been set. If the STOP key has been set the program clears the time or count on flag and proceeds to the DIS routine. If the STOP key has not been set the program determines whether or not the T/C-ON flag has been set. If the T/C-ON flag has been set, an error condition is indicated and the error flag is set. If, however, this flag has not been set, the program then determines whether the LOAD key has been depressed. If the LOAD key has been depressed, the program sets the load flag and returns to the DIS routine. If the LOAD key has not been depressed, the load flag is tested and the error flag is set if the load flag has not been previously set. However, if the load flag has been set indicating that the LOAD key was previously set, the program then determines which of the two keys, TWX or TELEX, has been depressed and sets the appropriate flag according to which one has been depressed before returning to the display and read subroutine. If neither transmission rate key has been depressed, the key number selected is loaded into the T/C register before the program returns to the DIS routine.

Returning to the clock flag test (FIG. 6), if the clock flag has been set indicating that the user has selected the clock mode, the program determines whether the START key has been depressed. If it has, as indicated by path "D" in FIG. 6, the clock register contents are tested to determine whether they are legal, that is, whether the contents of the clock register represent a corresponding time. If they do not, the clock register contents are illegal and the error flag is set before the program returns to the DIS routine. However, if the contents of the clock register are legal, the clock-on flag is set before the program returns to the DIS routine. If the START key test indicates that the START key has not been depressed, the program then tests the status of the STOP key. If the STOP key has been depressed, the clock-on flag is cleared and the program returns to the DIS routine. If the STOP key has not been depressed, the program then tests the status of the clock-on flag. If this flag has been set an error condition exists and the error flag is set before the program returns to the DIS routine. However, if the clock-on flag has not been set, the program tests the LOAD key status. If the LOAD key has been depressed, the clock register is cleared and the program returns to the DIS routine. However, if the LOAD key has not been depressed, the program tests whether any of the numerical value keys has been set. If none of those keys has been set, an error exists, the error flag is set and the program returns to the DIS routine. However, if one of the numerical value keys has been set, the program loads the key number into the clock register before returning to the DIS routine.

As previously indicated in the discussion of FIG. 5, a 60 Hz. signal is derived from the AC power supply and input to the microcomputer for purposes of providing a time base for clock counting operation. This 60 Hz. signal is handled as an external interrupt in the program as indicated in the lower right-hand portion of FIG. 6. As shown therein, the 60 Hz. signal generates a clock interrupt signal which results in the program decrementing the seconds count register. After this register is decremented it is tested to determine whether or not the count has reached zero. If it has not reached zero, the interrupt sequence is exited and the program returns to the step in the primary routine in progress when the interrupt was received. However, if the count has reached zero indicating that the 60th pulse in a 60 cycle signal has been received, which is equivalent to the time passage of one full second, the count register is reset and the clock register is incremented to reflect the passage of one second of time. After the clock register is incremented, the register contents are tested to determine whether the time indicated therein exceeds twelve hours, fifty nine minutes and fifty nine seconds. If this time is exceeded, the clock register is reset to zero, otherwise the clock sub-routine is exited.

From the above description of the structure of the invention and of the program contained within microcomputer 30, it will now be clear that the operation of the invention may be carried out as follows:

After the primary power is applied to the apparatus by connecting power supply 90 to a suitable AC source, the user selects which one of the three possible modes of operation is to be utilized.

When the invention is first activated, microcomputer 30 automatically selects the clock mode of operation and initiates a display of 00:00:00 and then continues to increment the display in one second intervals. The clock light CLK of LED array 60 is also illuminated to indicate the status of the program. The user may then select a different time to be displayed by depressing the STOP key on keyboard 50 and by then depressing appropriate numerical value keys for the selected time. As these keys are depressed, display 40 simultaneously displays the changes being made. After the start time is selected, the clock cycle is started by depressing the START key on keyboard 50 after which microcomputer 30 calculates the real time by using the 60 Hz. signal time base input from the line signal. If an illegal time has been entered, by way of example, 15 hours, 79 minutes and 83 seconds, microcomputer 30 recognizes the illegality of this entry and terminates changes in display 40 while illuminating error light ERR in LED array 60. In order to correct the illegal entry, the STOP key must be depressed and a legal time number entered by means of the numerical keys. On the other hand, if display 40 is to be started from zero time, only the ENTER key need be depressed and microcomputer 30 will automatically detect that condition and upon that entry will reset the time to 00:00:00 after the STOP key has been depressed and while it awaits depression of the next start command. Microcomputer 30 continues to track the real time which continues to run internally even if the time or count mode is selected. To recall real time it is only necessary to depress the CLOCK key on keyboard 50 for display 40 to revert to a real time display.

To activate the count mode, the user depresses the CNT key on keyboard 50 and then depresses the STOP key which results in constant information being displayed by display 40, and illumination of the LED count light CNT. The remaining sequences and operations of the count mode are similar to the below described sequences and operations of the time mode, except that display 40 displays the elapsed minutes and number of characters remaining before the next whole minute of message time is reached. Keyboard entry is also slightly different in that the user can pre-program the number of characters and time corresponding to sign-on and sign-off periods if he so desires. In both the time mode and count mode, after the LOAD key is depressed, the user can pre-program the approximate sign-on and sign-off times before selecting either the TELEX or TWX transmission rates.

If the time mode is desired, the time key on keyboard 50 is depressed resulting in the transfer of the corresponding key code by encoder 20 to microcomputer 30. Then the STOP key is depressed on keyboard 50 so that any information displayed in display 40 is stopped and at the same time LED, TIM, of array 60 is activated to indicate that the unit is in a time mode. The ENTER key is then depressed. This results in a status check by the microcomputer of the last number previously stored in scratch pad memory at the location corresponding to the displayed time. Such number is recalled from memory and again displayed. If zeros were previously stored in that location, the display indicated when the STOP key is depressed will remain unchanged. The user then depresses either the TELEX or TWX key on keyboard 50, depending upon the type of service being utilized. A new elapsed time can then be entered by the user by depressing appropriate keys of the numerical keys 0 through 9 on keyboard 50. Then the START key is depressed to enable microcomputer 30 to begin calculating the message time in minutes and tenths of minutes based upon the number of pulses received from the signal conditioner 80 input from tape reader 70. If the preset, elapsed running time is invalid, the error light ERR on the LED display 60 is illuminated and the display freezes. The user can then reset the error light and re-enter appropriate time data by first entering a legal time into the system by means of keyboard 50 and by then again depressing the START key.

SUMMARY

It will now be understood that what has been disclosed herein is a tape perforation feed-back device which calculates and displays the transmission time that will be required to send a message while it is being prepared for later transmission by teletypewriter exchange services such as TELEX, TWX, and the like. As a result of the present invention, users of teletypewriters exchange services can prepare their messages while anticipating the actual transmission charges. One important advantage resulting from such anticipation is that users can more efficiently utilize charge transmission time that would otherwise not be utilized for actual transmission of message information because of a whole minute round-up charge procedure. Thus the present invention provides a device for displaying data related to the message time required for the transmission of teletypewriter exchange service information which is compatible with both TELEX and TWX paper tape code language formats and with both TELEX and TWX message data rates and provides a portable low-cost message preparation timing system that does not require modification to the teletypewriter console per se.

Although a particular embodiment for carrying out the best mode of operation contemplated by the applicant has been disclosed herein, in which particular components of structural and programmable characteristics have been described, it will now be apparent to those having skill in the relevant art and with the benefit of applicant's teaching herein disclosed that many modifications may be made to the present invention. By way of example, other ways of coupling the invention to a teletypewriter console may be contemplated as well as additional modes of operation, keys, and display features which are modifications of the preferred embodiment disclosed. However, all such modifications are contemplated to be within the scope of the present invention which is to be limited only by the appended claims.

I claim:

1. An apparatus for use with teletypewriter consoles in teleprinter communication networks for providing transmission time information during message preparation by determining and displaying such information, the apparatus comprising:
    means for continuously detecting the number of characters in a teletypewriter message as it is being prepared for subsequent transmission;
    means for selecting a message transmission rate index corresponding to the transmission rate to be utilized by said communication network;
    means for selecting a pre-set time period corresponding to sign-on and sign-off times for message transmission; and
    means responsive to said detecting means, to said index selecting means, and to said time period selecting means for determining and displaying the period of time required to transmit said number of characters.

2. The apparatus defined in claim 1 wherein said means for continuously detecting comprises:
    a photoelectric sensing circuit having means for receiving a pulse of incident light upon occurrence of a character generated by said teletypewriter and further having means for generating a pulse signal in response thereto.

3. An apparatus as defined in claim 2 wherein said means for selecting a message rate index comprises:
    at least one key on a keyboard comprising a plurality of keys, said key being electrically linked to a digital computer having a memory device for storing, in table format, a plurality of data signals representing message transmission time corresponding to each of a plurality of numbers of characters and for at least one rate of transmission.

4. An apparatus as defined in claim 3 wherein said means for selecting a pre-set time period comprises:
    a plurality of numerically valued keys on a keyboard each electrically linked to said digital computer, said digital computer having an additional memory device to store data signals representing numerical time periods.

5. An apparatus as defined in claim 4 wherein said responsive means comprises:
    a register for accumulating a count corresponding to the number of pulse signals generated by said sensing circuit;
    means in said digital computer for fetching rate data signals from said stored table of data in correspondence to said count in said register and for fetching time data signals from said memory in correspondence to said time period selection;
    means in said digital computer for additively combining said rate data signals and said time data signals for generating information data signals corresponding to the period of charge time required to transmit the number of message characters corresponding to said count at said transmission rate, and
    a display responsive to said information data signals for continually indicating said period of charge time.

6. An apparatus for use in conjunction with teletypewriter consoles for providing information regarding time of transmission of messages in preparation for subsequent transmission over teleprinter communication networks, the apparatus comprising:
    a keyboard having means for selecting one of a plurality of transmission rates each of which corresponds to a known period of time for transmitting a message character;
    a message character sensing device for detecting the occurrence of each character being generated and having means for producing a corresponding electrical signal representative of each such occurrence;
    a microcomputer connected to said keyboard and to said sensing device, having a register for accumulating a count corresponding to the number of character occurrence signals produced by said sensing device, and having a memory device preprogrammed to store therein tables of message transmission times including at least one table for each transmission rate in said plurality, each such table having a plurality of signal codes representative of said transmission times and arranged in known correspondence to said register count;

said microcomputer being responsive to said rate selecting means of said keyboard and to said accumulating count of said register to fetch from said memory device the particular signal code that is indicative of the time required to transmit the number of characters represented by said character count at the selected transmission rate; and a digital display device connected to said microcomputer for receiving said fetched signal code and for displaying said transmission time.

7. The apparatus defined in claim 6 wherein said message character sensing device comprises:

a photoelectric sensing circuit having means for receiving a pulse of incident light upon occurrence of a character generated by said teletypewriter and further having means for generating a pulse signal in response thereto.

8. The apparatus as defined in claim 6 further comprising:

means in said microcomputer for generating said signal code in a selected one of a plurality of selectable formats for display in said digital display device, said formats including a first format corresponding to the number of whole minutes and fractional minutes for the required transmission time, and a second format corresponding to the number of whole minutes of transmission time plus the number of characters available before the next whole minute of said message time is achieved.

9. The apparatus as defined in claim 8 wherein said keyboard further comprises means for selecting one of said formats.

10. The apparatus as defined in claim 6 further comprising:

means on said keyboard for selecting numerical value codes corresponding to a pre-set time period which represents the sum of the sign-on and sign-off times for message transmission, and means in said microcomputer for adding said pre-set time period code to said signal code whereby the sum is displayed by said digital display device.

11. The apparatus as defined in claim 8 further comprising:

means in said microcomputer for generating a real time signal code for display in said digital display device when neither of said first or second formats is selected.

12. In a teleprinter communications network of the type having teletypewriter consoles for transmitting and receiving messages over such a network, and wherein a plurality of consoles each include a tape perforating and reading device for preparing messages for being transmitted, the improvement comprising:

an apparatus for use with said teleprinter consoles that include said tape perforating and reading device, the apparatus having means adapted to continually sense the occurrence of message characters on a perforated tape being generated by said device while a message is being prepared for subsequent transmission and to generate an electrical signal representative of each such occurrence, the apparatus further comprising:

a keyboard having means for selecting one of a plurality of transmission rates each of which corresponds to a known period of time for transmitting a message character;

a microcomputer connected to said keyboard and to said sensing means and having a register for accumulating a count corresponding to the number of character occurrence signals produced by said sensing means, and having a memory device preprogrammed to store therein tables of message transmission times including at least one table for each transmission rate in said plurality, each such table having a plurality of signal codes representative of said transmission times and arranged in known correspondence to said register count;

said microcomputer being responsive to said rate selecting means of said keyboard and to said accumulating count of said register to fetch from said memory device the particular signal code that is indicative of the time required to transmit the number of characters represented by said character count at the selected transmission rate; and a digital display device connected to said microcomputer for receiving said fetched signal code for displaying said transmission time.

13. The improvement recited in claim 12 wherein said sensing means comprises:

light emitting means producing a beam of light of cross section having dimensions substantially equal to the perforations in said tape;

light sensitive means producing an electrical signal having a parameter dependent upon whether a light is incident thereon; and structural means supporting said light emitting means and said light sensitive means in spaced alignment and forming a passageway therebetween that is adapted to receive said perforated tape whereby said tape blocks said beam of light except when a tape perforation corresponding to a message character passes through said beam of light.

* * * * *